US011384531B2

(12) United States Patent
Miller (10) Patent No.: US 11,384,531 B2
(45) Date of Patent: Jul. 12, 2022

(54) INTERCONNECTS FOR TEMPORARILY COUPLING MODULAR FRAME MEMBERS

(71) Applicant: Eric Miller, Wellesley, MA (US)

(72) Inventor: Eric Miller, Wellesley, MA (US)

( * ) Notice: Subject to any disclaimer, the term of this patent is extended or adjusted under 35 U.S.C. 154(b) by 139 days.

(21) Appl. No.: 16/830,509

(22) Filed: Mar. 26, 2020

(65) Prior Publication Data

US 2020/0308826 A1 Oct. 1, 2020

Related U.S. Application Data

(60) Provisional application No. 62/824,918, filed on Mar. 27, 2019.

(51) Int. Cl.
  *E04B 1/58* (2006.01)
  *F16B 7/00* (2006.01)
  *E04B 1/41* (2006.01)

(52) U.S. Cl.
  CPC .............. *E04B 1/58* (2013.01); *E04B 1/40* (2013.01); *F16B 7/00* (2013.01); *E04B 2001/5887* (2013.01)

(58) Field of Classification Search
  CPC ...... E04B 1/40; E04B 1/58; E04B 2001/5887; E04B 1/585; E04B 2001/5856; F16B 7/00; F16B 7/0453; F16B 2001/0035
  See application file for complete search history.

(56) References Cited

U.S. PATENT DOCUMENTS

| | | | | |
|---|---|---|---|---|
| 1,817,775 A | * | 8/1931 | Sipe | F16B 7/04 403/361 |
| 2,463,124 A | * | 3/1949 | Sims | F16B 7/02 403/334 |
| 2,550,775 A | * | 5/1951 | Clark | B25B 23/12 81/438 |
| 3,437,362 A | * | 4/1969 | Gottfried | F16B 7/0413 403/297 |
| 3,532,369 A | * | 10/1970 | William | F16B 7/0446 403/176 |
| 3,645,569 A | * | 2/1972 | Reilly | A47B 47/0008 403/4 |
| 4,770,560 A | * | 9/1988 | Ott | A47B 47/0008 403/296 |

(Continued)

*Primary Examiner* — Babajide A Demuren
(74) *Attorney, Agent, or Firm* — Louis J. Fanco; Law Office of Louis J. Franco (57) ABSTRACT

An interconnect system for coupling first and second frame members includes female and male interconnect members. The female interconnect is secured to the first frame member and has defined therein a receptacle. The male interconnect member is secured to the second frame member and defines a protrusion configured for selective axial insertion into, and mating engagement with, the receptacle. The receptacle extends axially between a receptacle opening through which the protrusion is axially received and a receptacle rear wall at which the receptacle terminates. The protrusion terminates at a protrusion tip. The receptacle and protrusion are furthermore configured such that at least one of (a) the receptacle and the protrusion are complementarily keyed in order to prevent relative rotational displacement of the male and female interconnect members when they are in mutual mating engagement, and (b) the protrusion tip is magnetically attracted toward the receptacle rear wall.

12 Claims, 7 Drawing Sheets

(56) References Cited

U.S. PATENT DOCUMENTS

| | | | | |
|---|---|---|---|---|
| 5,451,115 A * | 9/1995 | Sayres | ............... | A47B 47/0008 403/171 |
| 5,603,248 A * | 2/1997 | Eggert | .................... | B25B 15/02 81/125 |
| 5,964,237 A * | 10/1999 | Lin | ........................ | A45B 19/08 135/114 |
| 6,082,070 A * | 7/2000 | Jen | ............................ | E04B 1/24 403/170 |
| 6,817,478 B2 * | 11/2004 | Venegas, Jr. | ............ | A47F 5/137 211/182 |
| 7,300,059 B2 * | 11/2007 | Caruso | ................. | A63B 63/004 273/400 |
| 2008/0028900 A1 * | 2/2008 | Chiang | .................. | B25B 23/12 81/440 |
| 2009/0194991 A1 * | 8/2009 | Yang | ....................... | E04B 1/585 285/31 |

* cited by examiner

INTERCONNECTS FOR TEMPORARILY COUPLING MODULAR FRAME MEMBERS

PROVISIONAL PRIORITY CLAIM

Priority based on Provisional Application Ser. No. 62/824,918 filed Mar. 27, 2019, and entitled "INTERCONNECTS FOR TEMPORARILY COUPLING MODULAR FRAME MEMBERS" is claimed. Moreover, the entirety of the previous provisional application, including the drawings, is incorporated herein by reference as if set forth fully in the present application.

EXPRESS INCORPORATION BY REFERENCE OF PRIOR PATENT DOCUMENT

Although the summary, detailed description, and drawings self-contained within the present application provide more than ample descriptive disclosure for a person of ordinary skill in the related art to make and practice the invention without undue experimentation, additional suggestive environmental context may also prove useful. Accordingly, reference is made to US Patent Application Publication No. 2017/0178550 published Jun. 22, 2017 in the name of Eric Miller—the same Applicant as in the present case—for BACKLIT DISPLAY SYSTEM (hereinafter, the '550 Publication). The '550 Publication is a publication of U.S. patent application Ser. No. 15/294,761, which is now abandoned, and priority benefits are not claimed in application Ser. No. 15/294,761.

While the '550 Publication does not directly address the inventive subject matter claimed in the present application, it provides a detailed description of an illustrative, non-limiting environment in which embodiments of the present invention may be implemented (i.e., a backlit display system). Although the most relevant sections of the '550 Publication are those relating to the description of modular frameworks assembled from a plurality of selectively joinable frame segments, the entirety of the '550 Publication is nevertheless expressly incorporated by reference into the present disclosure as if fully set forth herein.

BACKGROUND

There are numerous environments and applications calling for the temporary assembly of modular frame works. Temporary frameworks are assembled to support tents, canopies, signage, scaffolding for construction or renovation projects, and backlit display systems such as those described in the aforementioned '550 Publication. During the assembling of such frameworks, tubular frame members may be joined to one another in an end-to-end configuration, for example, and/or at elbow joints. When assembling such structures, it is frequently difficult to keep already-joined frame member together or properly aligned without unwanted relative rotation, for example, until nearly the entire structure is assembled. Such a task can be rendered easier to perform when multiple people are able to assist, but this is not always an option.

Accordingly, a need exists for sets of interconnects that substantially reduce the difficulty of temporarily assembling modular frame members by providing a reliable temporary joint between already-assembled frame members as a larger overall temporary frame work is assembled by one or more persons.

SUMMARY

Alternatively embodied interconnects (alternatively, "connectors") for modular frame members are broadly implementable as an interconnect system across a wide variety of contexts and settings in which modular frame members must be temporarily assembled to form a framework. While an illustrative, non-limiting set of examples includes display shelves, storage shelves, tents and canopies, and scaffolding, embodiments of the invention are considered herein principally in the context that inspired the inventive concept: temporary backlit displays of a type frequently used at tradeshows. Accordingly, any description of alternative embodiments of the invention in the specific context of backlit displays and/or tradeshow exhibits should not in itself be interpreted to unduly restrict the scope of the overall inventive concept.

In each of an illustrative set of alternative versions, an interconnect system is configured for the temporary and mutual coupling of first a second frame members, at least the first and second frame members constituting elements of an overall larger modular framework. The interconnect system facilitates selective coupling of the first and second frame members along an interconnection axis. In instances, for example, in which the interconnect system is used to selectively couple elongated first and second frame members extending along, respectively, first and second longitudinal frame-member axes, the interconnection axis may or may not coincide (i.e., be coaxial with) with either the first or second longitudinal frame-member axis.

Illustratively embodied, an interconnect system includes complementary female and male interconnect members. The female interconnect member includes an interior surface defining a receptacle and an exterior surface configured for mechanical securement to the first frame member. The male interconnect member includes first and second outer surfaces. The first outer surface defines at least in part a base configured for mechanical securement to the second frame member. The second outer surface defines a protrusion that extends away from the base and is configured for selective axial insertion (i.e., along the interconnection axis) into, and mating engagement with, the receptacle defined within the female interconnect member.

With greater specificity, in order to facilitate the mutual mating engagement of the female and male interconnect members, the interior surface of the female interconnect member—and the receptacle defined at least in part thereby—extends axially between a receptacle opening through which the protrusion of the male interconnect member is axially received and a receptacle rear wall at which the receptacle terminates. Additionally, the male interconnect member is configured such that the protrusion terminates at a protrusion tip situated opposite the base.

In some applications, it is desirable that the male and female interconnect members be prevented from rotating relative to one another. Accordingly, in at least one version, the receptacle and the protrusion are complementarily keyed in order to prevent relative rotational displacement of the male and female interconnect members when they are in mutual mating engagement. "Keying" can be achieved in various alternative ways that, in and of themselves, are immaterial to various embodiments of the invention. One example involves the inclusion of a lug on one of the interior surface defining the receptacle of the female interconnect member and the second outer surface defining the protrusion of the male interconnect member and a groove for receiving the lug on the other of protrusion and the interior surface of the receptacle. Another option is to simply configure the receptacle and protrusion such that they are other than circular in cross section as viewed into a cross-sectional plane orientated orthogonally to the interconnection axis.

In still additional applications, a temporary hold of the mating engagement between the male and female interconnect members that relies on more than gravity and/or friction is desirable. Therefore, according to at least one version, when the protrusion of the male interconnect member protrudes at least partially into the receptacle of the female interconnect member, the protrusion tip is magnetically attracted toward the receptacle rear wall. This is illustratively achieved by the inclusion of a first magnetic element (hereinafter alternatively referred to as "magnet") on or along one of the receptacle rear wall and the protrusion tip and a material magnetically attracted to the first magnet on or along the other of the protrusion tip and the receptacle rear wall. The material magnetically attracted to the first magnet can be at least one of metal and a second magnet (i.e, magnetic element). Although the invention is not expressly so limited, it is envisioned that magnets employed be permanent magnets.

It can be readily envisioned that, while it may be desirable in some applications to prevent relative rotation between the mated male and female interconnect members, preventing rotation between the female interconnect member and the first frame member and/or the male interconnect member and the second frame member may be of lesser or no importance. However, in various embodiments, at least one of (a) the female interconnect member is secured against axial and rotational displacement relative to the first frame member, and (b) the male interconnect member is secured against axial and rotational displacement relative to the second frame member. This may be achieved through any of various means, such as, illustratively, the use of adhesives, mechanical fasteners (e.g., screws, rivets), press fitting, and/or "keyed" configuring to create an interference fit between at least one of the female and male interconnect members and its respective first and second frame member.

In many applications, frame members to be selectively coupled are of tubular configuration. "Tubular" in this context is to be interpreted broadly so as not to be restricted by assumption or implication to cylindrical frame members (i.e., frame members having circular cross sections). More specifically, "tubular" frame members can exhibit any of various cross-sectional geometries including by way of non-limiting example (i) circular (cylindrical tubes); (ii) rectangular, including square, or (iii) other regular polygonal or irregular polygonal. For purposes of illustration and explanation, the drawings and the detailed description in which they are described focus on tubular frame members of circular cross section (i.e., elongated cylindrical tubes).

Representative embodiments are more completely described and depicted in the following detailed description and the accompanying drawings.

DETAILED DESCRIPTION

The following description of variously embodied interconnect systems is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to restrict the maximum scope of the claims. Moreover, among the various depicted embodiments, like reference numbers are used to refer to similar or analogous components.

Figure 1:
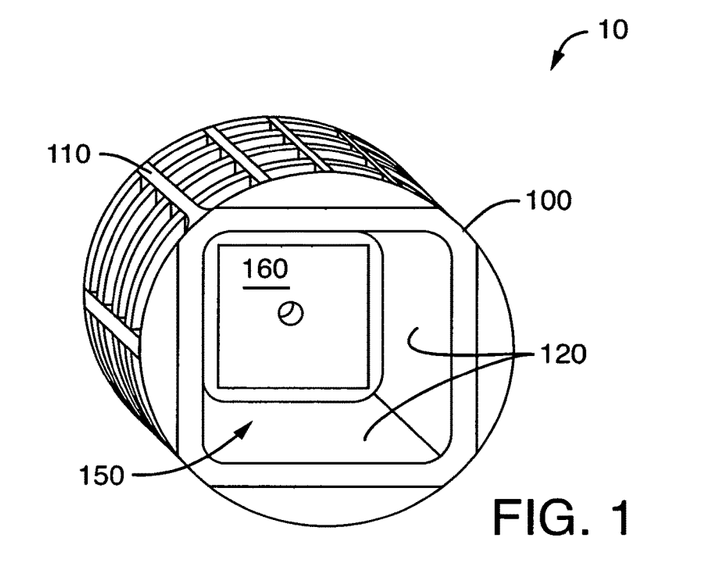
FIG. 1 shows an endwise perspective view of a female interconnect member configured for selective mating engagement with a male interconnect member along an interconnection axis.
Figure 1A:
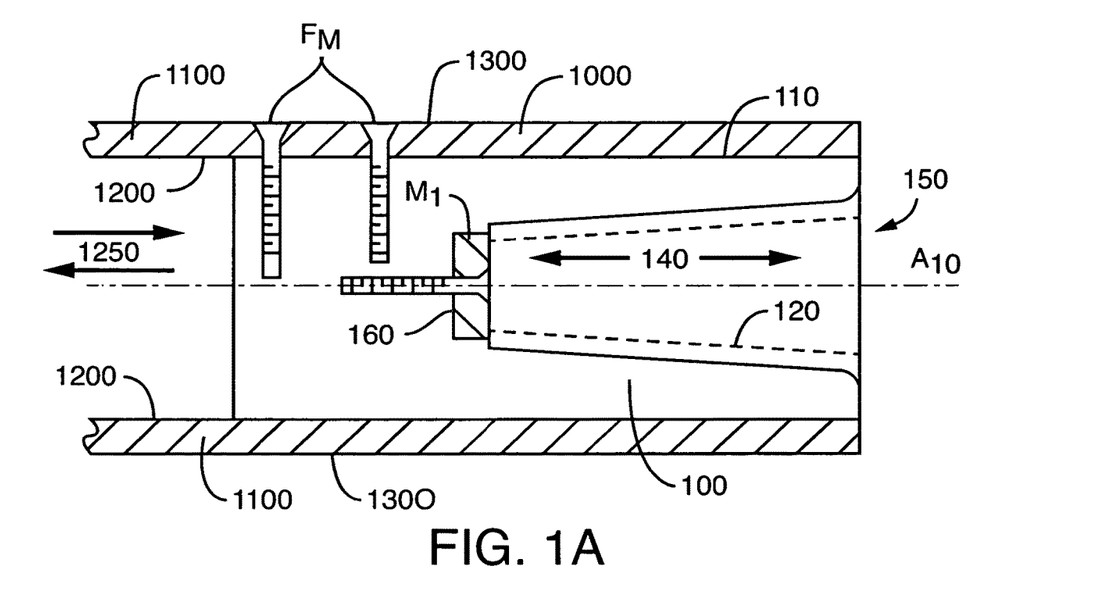
FIG. 1A is a cross-sectional view of the female interconnect member of FIG. 1 as viewed into a cross-sectional plane that includes the interconnect axis.
Figure 2:
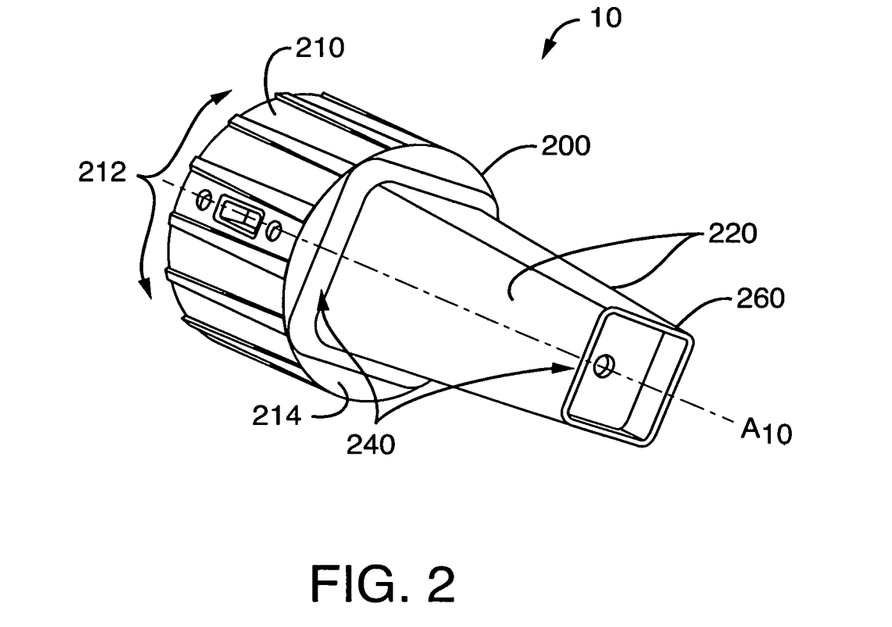
FIG. 2 is a perspective view of a male interconnect member configured for selectively mating engagement with the female interconnect member of FIGS. 1 and 1A along the interconnection axis.
Figure 2A:
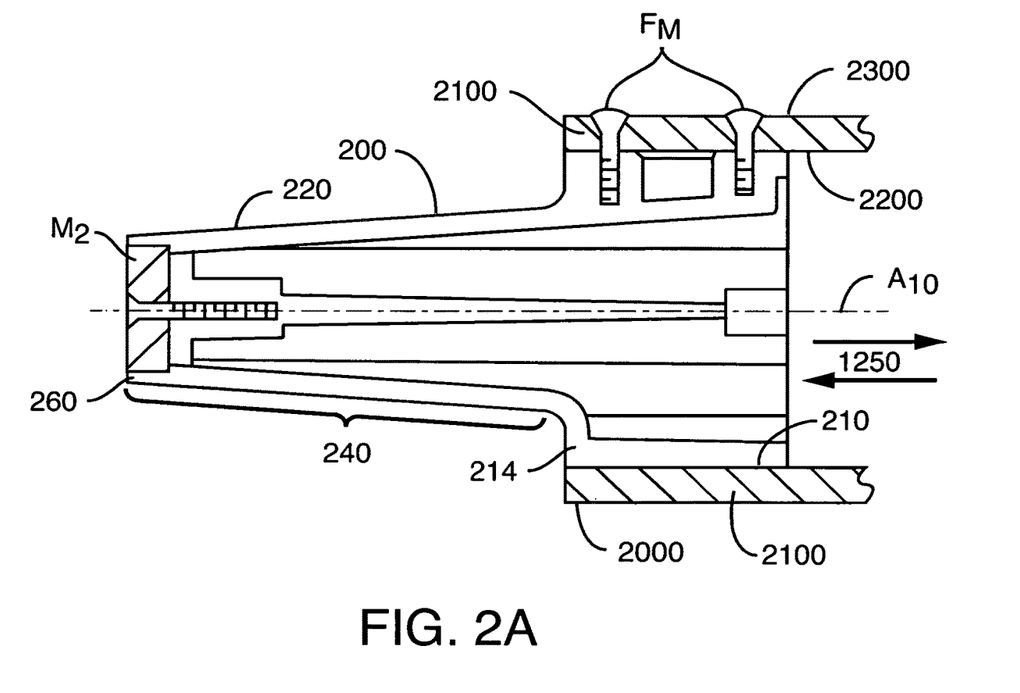
FIG. 2A is a cross-sectional view of the male interconnect member of FIG. 2 as viewed into a cross-sectional plane that includes the interconnect axis.
Figure 3:
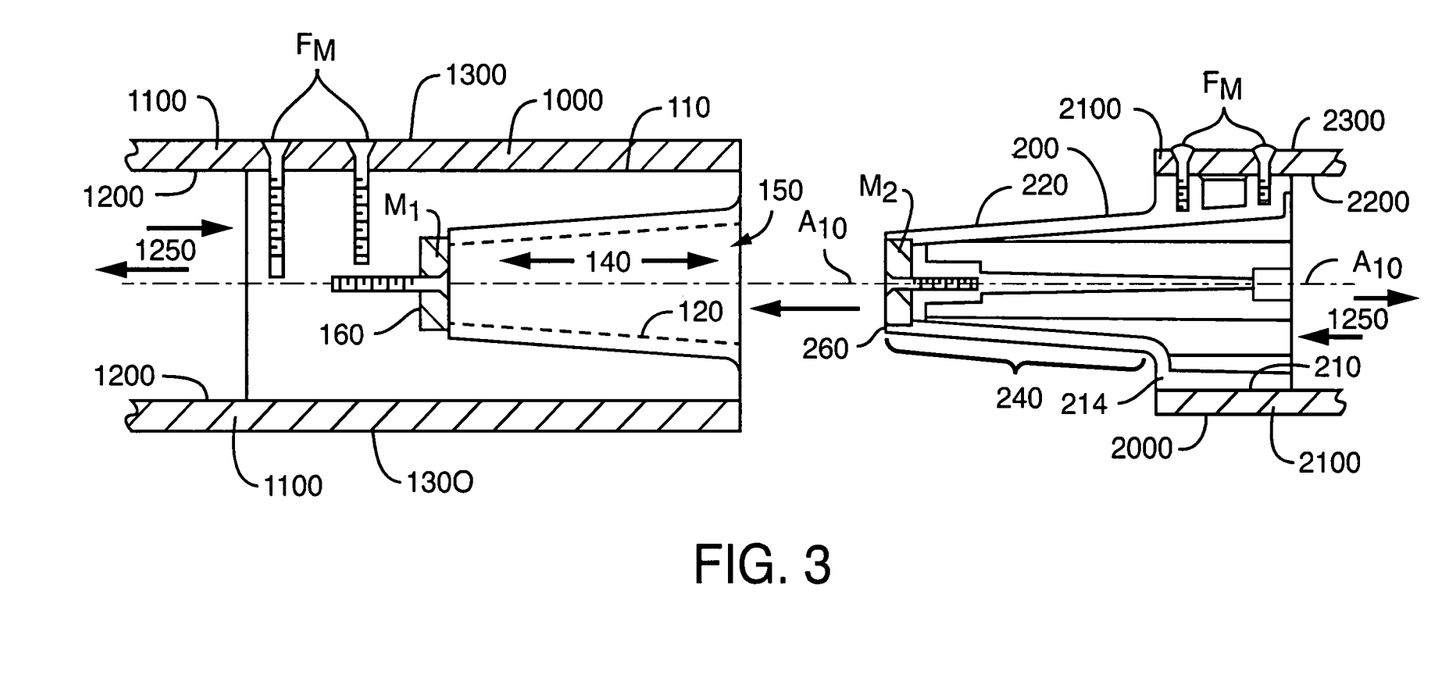
FIG. 3 is a cross-sectional view of the male interconnect member of FIGS. 2 and 2A axially aligned with the female interconnection member of FIGS. 1 and 1A for axial insertion into, and mating engagement therewith in order to temporarily couple elongated first and second frame members.

Shown in FIGS. 1-3 are the main elements of an interconnect system 10 for temporarily coupling first and second tubular frame members 1000 and 2000, portions of which frame members 1000 and 2000 are shown in cross section in FIGS. 1A, 2A, and 3. The interconnect system 10 includes female and male interconnect members 100 and 200. An end-wise perspective view of an illustrative female interconnect member 100 is shown in FIG. 1, with a cross-sectional view of the same shown in FIG. 1A. Similarly, a perspective view of an illustrative male interconnect member 200 is shown in FIG. 2, with a cross-sectional view of the same shown in FIG. 2A. The female and male interconnect members 100 and 200 are configured for mutual cooperative mating engagement (i.e., coupling) along an interconnect axis $A_{IC}$, with the spatial orientation of the interconnect axis $A_{IC}$ indicated in the independent cross-sectional illustrations of the female and male interconnect members 100 and 200 of, respectively, FIGS. 1A and 2A, as well as singularly in the cross-sectional views of FIG. 3.

Referring now to FIGS. 1 and 1A, the female interconnect member 100 includes an exterior surface 110 and an interior surface 120 defining a receptacle 140. In FIG. 1A, the female interconnect member 100 is shown inserted into a first tubular frame member 1000 having a frame-member wall 1100 with frame-member interior and exterior surfaces 1200 and 1300. The frame-member interior surface 1200 of the first tubular frame member 1000 defines a first-frame-member channel 1250 into which the female interconnect member 100 is inserted. The exterior surface 110 of the female interconnect member 100 is configured for mechanical engagement with the frame-member interior surface 1200 of the first tubular frame member 1000. In this particular case, the female interconnect member 100 is secured within the first-frame-member channel 1250 with mechanical fasteners $F_M$ (screws, in the example depicted) driven through the frame-member wall 1100 and into the female interconnect member 100. The mechanical fasteners $F_M$ secure the female interconnect member 100 against both axial and rotational displacement relative to the first tubular frame member 1000.

With reference now to FIGS. 2 and 2A, the male interconnect member 200 includes first and second outer surfaces 210 and 220. The first outer surface 210 defines at least in part a base periphery 212 of a base 214 configured for mechanical engagement with, and securement to, the second tubular frame member 2000. More specifically, the base 214 of the male interconnect member 200 is shown inserted into a second tubular frame member 2000 having a frame-member wall 2100 with frame-member interior and exterior surfaces 2200 and 2300. The frame-member interior surface 2200 of the second tubular frame member 2000 defines a second-frame-member channel 2250 into which the male interconnect member 200 is inserted. The first outer surface 210 of the male interconnect member 200 is configured for mechanical engagement with the frame-member interior surface 2200 of the second tubular frame member 2000. In this particular case, the male interconnect member 200 is secured within the second-frame-member channel 2250 with mechanical fasteners $F_M$ (screws, in the example depicted) driven through the frame-member wall 2100 and into the male interconnect member 200. The mechanical fasteners $F_M$ secure the male interconnect member 200 against both axial and rotational displacement relative to the second tubular frame member 2000.

The second outer surface 220 of the male interconnect member 200 defines a protrusion 240 that extends along the interconnection axis $A_{IC}$ away from the base 214 and is configured for selective axial insertion (i.e., along the interconnection axis $A_{IC}$) into, and mating engagement with, the receptacle 140 defined within the female interconnect member 100. In order to facilitate the mutual mating engagement of the female and male interconnect members 100 and 200, the interior surface 120 of the female interconnect member 100—and the receptacle 140 defined at least in part thereby—extends axially between a receptacle opening 150, through which the protrusion 240 of the male interconnect member 200 is axially received, and a receptacle rear wall 160 at which the receptacle 140 terminates. Additionally, the male interconnect member 200 is configured such that the protrusion 240 terminates at a protrusion tip 260 situated axially opposite the base 214. In various configurations, including those illustratively depicted among FIGS. 1-3, the protrusion 240 is tapered downwardly in the direction extending away from the base 214 toward the protrusion tip 260 and the receptacle 140 is tapered downwardly in the direction extending away from the receptacle opening 150 toward the receptacle rear wall 160 in order to facilitate axial insertion of the protrusion 240 into the receptacle 140 along the interconnection axis $A_{IC}$.

As discussed in the summary section of the present specification, it is desirable for some applications that the female and male interconnect members 100 and 200 be prevented from rotating relative to one another when cooperatively mated. Accordingly, in at least one version, the receptacle 140 and the protrusion 240 are complementarily keyed in order to prevent relative rotational displacement of the mutually mated female and male interconnect members 100 and 200. In the version of the interconnect system 10 including the female and male interconnect members 100 and 200 of FIGS. 1-3, each of the receptacle 140 and protrusion 240 is of a cross-sectional geometry that is substantially square with rounded/radiused corners as viewed into a cross-sectional plane perpendicular to the interconnect axis $A_{IC}$ (not shown because readily envisioned). It will be readily understood that the other-than-round cross-sectional geometries of the receptacle and protrusion 140 and 240 prevent rotation of the female and male interconnection members 100 and 200 relative to one another when the protrusion 240 is fully axially inserted into the receptacle 140.

As also discussed in the summary, various embodiments facilitate the magnetic attraction of the protrusion tip 260 toward the receptacle rear wall 160 in order to provide a mechanical bias toward mating engagement of—and enhance the temporary hold between—the female and male interconnect members 100 and 200. With reference to FIGS. 1A and 3, there is shown secured to the receptacle rear wall 160 a first magnetic element $M_1$. Similarly, in FIG. 2A, and also FIG. 3, there is shown secured to the protrusion tip 260 a second magnetic element $M_2$. Either one of the first and second magnetic elements $M_1$ and $M_2$ can be a permanent magnet, while the other of first and second magnetic elements $M_1$ and $M_2$ can be a material magnetically attracted to the permanent magnet such as a metal and/or a second permanent magnet.

As alluded to in the summary, there may arise circumstances in which first and second frame members and need to be joined in way such that the first and second longitudinal frame-member axes (not shown because readily envisioned) do not extend along a single common interconnect axis $A_{IC}$. Less abstractly, and more directly, first and second frame members may need to be joined in a way that they are not aligned along the same axis such as, by way of non-limiting example, at a corner at which the first and second frame members are joined at a 90° angle. Accordingly, embodiments of the invention further include angle connectors (hereinafter alternatively referred to as "elbows") for joining two frame members to form an angle other than 180° (i.e., a straight line).

Figure 4:
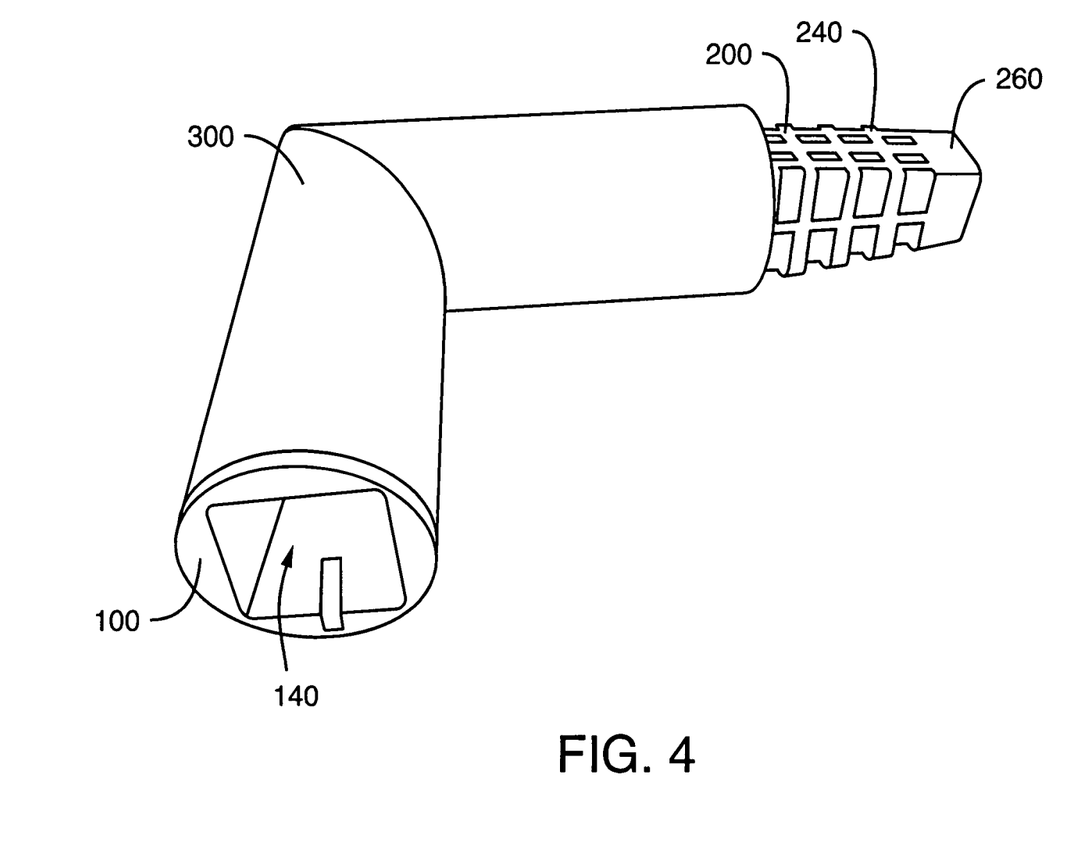
FIG. 4 shows an angle connector in isolation and including both a male and female interconnect member.
Figure 4A:
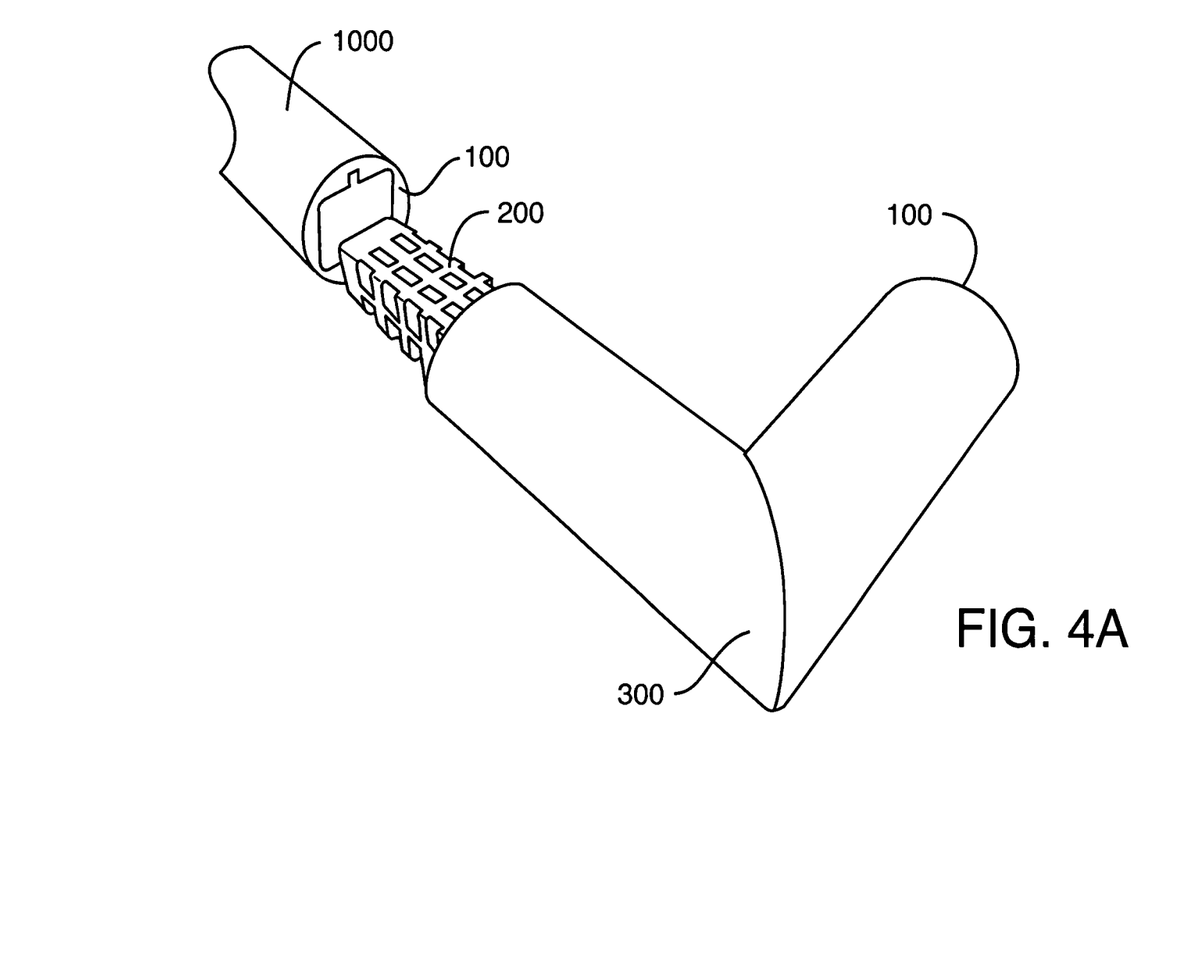
FIG. 4A depicts the angle connector of FIG. 4 and a tubular frame member with which it is to be coupled by inserting the male interconnect member of the angle connector into a female interconnect member secured within the tubular frame member.
Figure 4B:
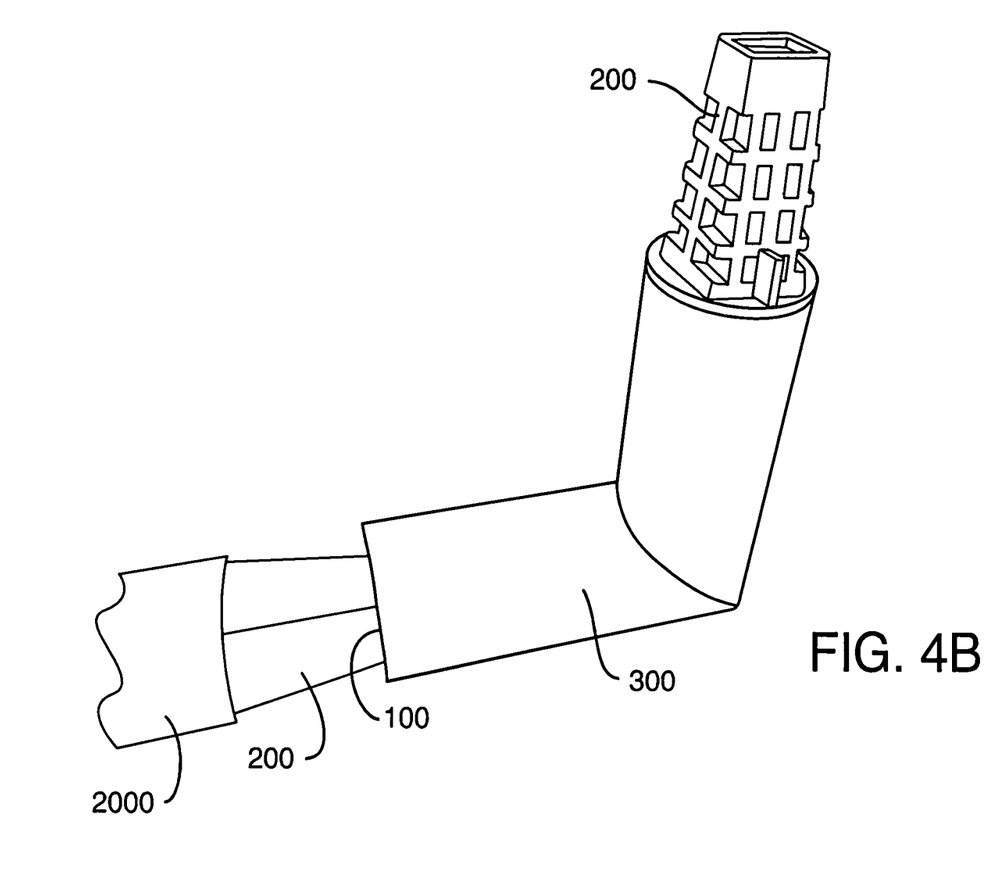
FIG. 4B depicts the angle connector of FIG. 4 and a tubular frame member with which it is to be coupled by inserting a male interconnect member of the tubular frame member into the female interconnect member of the angle connector.

Referring to FIGS. 4, 4A, and 4B, there is shown an angle connector 300. The angle connector 300 itself can be regarded as a frame member and furthermore includes—at least in the illustrative embodiment depicted—elements in common with both a female interconnect member 100 and a male interconnect member 200. Accordingly, to the extent that the angle connector 300 includes elements in common with, or corresponding to, previously discussed and depicted components and elements, like reference numbers are used to refer to said similar or analogous components and elements. Moreover, while the angle connector 300 is itself generally tubular and intended for joining first and second tubular frame members 1000 and 2000, it is to be understood, as with the case of previously discussed embodiments, this is for illustrative purposes only.

Referring now to FIG. 4 is which the angle connector 300 is shown in isolation, the angle connector 300 includes both a female interconnect member 100 and a male interconnect member 200. In all material respects, the female interconnect member 100 of the angle connector 300 functions in the same general way that the female interconnect member 100 of FIGS. 1, 1A, and 3 functions, while the male interconnect member 200 of the angle connector 300 functions in the same general way that the male interconnect member 200 of FIGS. 2, 2A and 3 functions. Accordingly, the previous description of the female and male interconnect members 100 and 200 provided in conjunction with FIGS. 1-3 is regarded as sufficient to constitute a full disclosure for purposes of antecedent basis of the female and male interconnect members 100 and 200 of the angle connector 300 of FIGS. 4-4A and, therefore, for the purposes of brevity and efficiency, the sub-elements thereof are simply numbered in FIGS. 4, 4A, and 4B with like reference numbers or, where correspondence among elements is clear enough through visual comparison, not numbered at all.

Referring now to FIG. 4A, a first tubular frame member 1000 has secured therein a female interconnect member 100 which is configured to receive for mating engagement the male interconnect member 200 of the angle connector 300. Relatedly, but conversely, with reference to FIG. 4B, a second tubular frame member 2000 has secure therein a male interconnect member 200 which is configured for insertion into, and mating engagement with, the female interconnect member 100 of the angle connector 300. Although the aforesaid connections were considered separately and in isolation from another, it will be readily appreciated by even a casual observer how performing both connection operations mutually joins the first and second tubular frame members 1000 and 2000.

Although the illustrative angle connector 300 of FIGS. 4, 4A, and 4B is "hermaphroditical" in the sense that it includes in a single component a female and male interconnect member 100 and 200, it is to be understood that this is illustrative and nonlimiting in nature. More specifically, well within the scope and contemplation of the invention is an angle connector 300 that incorporates either two female interconnect members 100 or two male interconnect members 200.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An interconnect system for temporarily coupling first and second frame members of a modular framework along an interconnection axis, the interconnect system comprising:
    a female interconnect member including an interior surface defining a receptacle and an exterior surface configured for mechanical securement to the first frame member; and
    a male interconnect member including first and second outer surfaces, the first outer surface defining a base configured for mechanical securement to the second frame member, and the second outer surface defining a protrusion that extends away from the base and is configured for selective axial insertion into, and mating engagement with, the receptacle defined within the female interconnect member, wherein
    (i) the interior surface of the female interconnect member extends axially between a receptacle opening through which the protrusion of the male interconnect member is axially received and a receptacle rear wall at which the receptacle terminates;
    (ii) the protrusion terminates at a protrusion tip situated opposite the base;
    (iii) the receptacle and the protrusion are complementarily keyed in order to prevent relative rotational displacement of the male and female interconnect members when they are in mutual mating engagement; and
    (iv) the protrusion tip is magnetically attracted toward the receptacle rear wall.

2. The interconnect system of claim 1 wherein at least one of
    (a) the female interconnect member is secured against axial and rotational displacement relative to the first frame member; and
    (b) the male interconnect member is secured against axial and rotational displacement relative to the second frame member.

3. The interconnect system of claim 2 wherein both
    (a) the female interconnect member is secured against axial and rotational displacement relative to the first frame member; and
    (b) the male interconnect member is secured against axial and rotational displacement relative to the second frame member.

4. The interconnect system of claim 3 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

5. The interconnect system of claim 2 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

6. The interconnect system of claim 1 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

7. An interconnect system for temporarily mutually coupling tubular first and second frame members of a modular framework along an interconnection axis, the interconnect system comprising:
    a female interconnect member including an interior surface defining a receptacle and an exterior surface configured for mechanical engagement with an interior surface of the first tubular frame member defining a first-frame-member channel within which the female interconnect member is secured against axial and rotational displacement relative to the first frame member; and
    a male interconnect member including first and second outer surfaces, the first outer surface defining the periphery of a base configured for mechanical engagement with an inside surface of the second tubular frame member defining a second-frame-member channel within which the male interconnect member is secured against axial and rotational displacement relative to the second frame member, and the second outer surface defining a protrusion that extends away from the base and is configured for selective axial insertion into, and mating engagement with, the receptacle defined within the female interconnect member, wherein
    (i) the interior surface of the female interconnect member extends axially between a receptacle opening through which the protrusion of the male interconnect member is axially received and a receptacle rear wall at which the receptacle terminates;
    (ii) the protrusion terminates at a protrusion tip situated opposite the base;

(iii) the receptacle and the protrusion are complementarily keyed in order to prevent relative rotational displacement of the male and female interconnect members when they are in mutual mating engagement; and
(iv) the protrusion tip is magnetically attracted toward the receptacle rear wall.

8. The interconnect system of claim 7 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

9. An interconnect system for temporarily coupling tubular first and second frame members of a modular framework along an interconnection axis, the interconnect system comprising:
  a female interconnect member including an interior surface defining a receptacle and an exterior surface configured for mechanical engagement with an interior surface of the first tubular frame member defining a first-frame-member channel within which the female interconnect member is secured; and
  a male interconnect member including first and second outer surfaces, the first outer surface defining the base periphery of a base configured for mechanical engagement with an inside surface of the second tubular frame member defining a second-frame-member channel within which the male interconnect member is secured, and the second outer surface defining a protrusion that extends away from the base and is configured for selective axial insertion into, and mating engagement with, the receptacle defined within the female interconnect member, wherein
    (i) the interior surface of the female interconnect member extends axially between a receptacle opening through which the protrusion of the male interconnect member is axially received and a receptacle rear wall at which the receptacle terminates;
    (ii) the protrusion terminates at a protrusion tip situated opposite the base; and
    (iii) the protrusion tip is magnetically attracted toward the receptacle rear wall.

10. The interconnect system of claim 9 wherein at least one of
    (a) the female interconnect member is secured against axial and rotational displacement relative to the first frame member; and
    (b) the male interconnect member is secured against axial and rotational displacement relative to the second frame member.

11. The interconnect system of claim 10 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

12. The interconnect system of claim 9 wherein the protrusion is tapered downwardly in the direction extending away from the base toward the protrusion tip and the receptacle is tapered downwardly in the direction extending away from the receptacle opening toward the receptacle rear wall in order to facilitate axial insertion of the protrusion into the receptacle along the interconnection axis.

* * * * *